United States Patent
Tresse

(10) Patent No.: US 9,005,715 B2
(45) Date of Patent: Apr. 14, 2015

(54) METHOD FOR THE SURFACE TREATMENT OF LARGE PARTS, GRIPPER OF PARTS SUITABLE FOR IMPLEMENTING SUCH A METHOD, USE OF SAID GRIPPER AND TREATMENT CUBICLE

(75) Inventor: David Tresse, Polaincourt (FR)

(73) Assignee: Compagnie Plastic Omnium, Lyons (FR)

( * ) Notice: Subject to any disclaimer, the term of this patent is extended or adjusted under 35 U.S.C. 154(b) by 315 days.

(21) Appl. No.: 13/519,164

(22) PCT Filed: Dec. 28, 2010

(86) PCT No.: PCT/FR2010/052927
§ 371 (c)(1),
(2), (4) Date: Oct. 15, 2012

(87) PCT Pub. No.: WO2011/080484
PCT Pub. Date: Jul. 7, 2011

(65) Prior Publication Data
US 2013/0026676 A1 Jan. 31, 2013

(30) Foreign Application Priority Data

Dec. 29, 2009 (FR) ...................... 09 59647

(51) Int. Cl.
*B05D 1/02* (2006.01)
*B05D 1/40* (2006.01)
*B05B 13/02* (2006.01)
*B05B 15/12* (2006.01)

(52) U.S. Cl.
CPC ......... *B05B 13/0221* (2013.01); *B05B 15/1207* (2013.01); *B05B 15/1214* (2013.01); *B05B 15/1222* (2013.01); *B05B 15/1229* (2013.01); *B05B 15/1266* (2013.01); *B05B 15/1288* (2013.01)

(58) Field of Classification Search
CPC ............ B05B 13/0221; B05B 15/1207; B05B 15/1222; B05B 15/1288
USPC ...................... 118/500, 503; 269/55; 427/424
See application file for complete search history.

(56) References Cited

U.S. PATENT DOCUMENTS

| | | | | |
|---|---|---|---|---|
| 5,263,753 A * | 11/1993 | Breu et al. | ................... | 294/99.1 |
| 5,743,958 A * | 4/1998 | Shutic | ............. | 118/308 |
| 6,173,947 B1 | 1/2001 | Johnson | | |
| 7,445,184 B1 | 11/2008 | Johnson | | |
| 2007/0281100 A1* | 12/2007 | Herre et al. | ................ | 427/407.1 |
| 2008/0142652 A1 | 6/2008 | Johnson | | |
| 2009/0025199 A1* | 1/2009 | Hariki et al. | ................... | 29/430 |

FOREIGN PATENT DOCUMENTS

| | | |
|---|---|---|
| DE | 102007063162 | 3/2009 |
| EP | 1745858 | 1/2007 |
| EP | 2072145 | 6/2009 |

* cited by examiner

*Primary Examiner* — Alexander Weddle
(74) *Attorney, Agent, or Firm* — Jacox, Meckstroth & Jenkins

(57) ABSTRACT

A system and method of painting parts of large dimensions that present a certain amount of flexibility that makes their shape geometrically unstable in the event of being moved. The surface of a part is moved in front of a paint spray device by an arm of a robot, while the spray device remains stationary relative to the robot and while the part is being deformed. Other elements include a gripper for gripping parts of large dimensions, the gripper being adapted to implement the method; an installation; and a booth for performing surface treatment of parts.

22 Claims, 4 Drawing Sheets

METHOD FOR THE SURFACE TREATMENT OF LARGE PARTS, GRIPPER OF PARTS SUITABLE FOR IMPLEMENTING SUCH A METHOD, USE OF SAID GRIPPER AND TREATMENT CUBICLE

CROSS-REFERENCE TO RELATED APPLICATIONS

This application is the U.S. National Phase application of PCT/FR2010/052927 filed Dec. 28, 2010, which claims priority to French Application No. 0959647 filed Dec. 29, 2009, which applications are incorporated herein by reference and made a part hereof.

BACKGROUND OF THE INVENTION

1. Field of the Invention

The present invention relates to a method of performing surface treatment on parts of large dimensions, in particular motor vehicle bodywork parts, and to a parts gripper that is adapted to implement such a method.

2. Description of the Related Art

Bodywork parts are usually painted by locally spraying paint in the form of droplets or solid particles onto the parts for painting, which parts are carried by moving supports that travel past paint spray stations while presenting the parts in a constant orientation that is appropriate for their treatment. In other words, the parts are moved in translation during painting operations, and while they are passing from one paint station to a following station, robots or operators sweep the local paint spray nozzles over the parts that are moving in translation.

That method, which has been practiced for several years, is considered as being optimal and has been adopted almost unanimously in the industry.

Nevertheless, although it provides high-quality results, it gives rise to small imperfections. At present, those small imperfections are not considered as being troublesome, however ever-increasing expectations in terms of quality may lead to requirements being increased in the future.

In the present description, the term "surface treatment" is used to mean any step in an overall method for treating the surface of a part. The overall method may consist in painting the part, in which case potential surface treatment methods are cleaning (by air-blast or cryogenically), flame scarfing, applying a primary, applying a color base, applying a varnish, or finishing treatment without paint, such as applying only varnish, or indeed performing quality control on the part, in which case the local treatment consists in scanning predefined portions of the part in order to send images to an image analyzer device, or indeed positioning a gasket or a bead of adhesive along a predetermined path.

In order to perform the above surface treatment, a local treatment device is used, e.g. a camera for a quality-control method or a paint spray nozzle for applying paint to the part.

The present invention seeks to propose a novel surface treatment method that further improves the quality of the treatment and/or of the parts obtained thereby, while in parallel also providing other advantages in industrial terms.

SUMMARY OF THE INVENTION

The present invention provides a method of performing surface treatment on parts of large dimensions that present a certain amount of flexibility that makes them geometrically unstable in shape in the event of being moved, the treatment being performed with the help of at least one local treatment device, and in which method a part having a surface for treatment is moved past the local treatment device with its surface for treatment facing towards the local treatment device, wherein the part is gripped at the end of a robot arm, the local treatment device is kept stationary relative to the robot, the part is deformed by imparting a deformed configuration thereto in which its deformable portions impose a stable geometrical shape on the part as a whole, and the part is moved by the robot arm relative to local treatment device in such a manner as to cause all of its surface for treatment to move past the local treatment device while the part is being held in its deformed configuration.

In a particular implementation, the local treatment device is one of the following devices: a nozzle for spraying paint or varnish; a scarfing blow torch; a compressed air injector for removing dust (cleaning by air blasting); a head for spraying liquid carbon dioxide ($CO_2$) for removing dust and degreasing parts (cryogenic cleaning); a quality-control camera.

The invention amounts to keeping stationary the local treatment device that was movable in the prior art, while causing the parts to move around the local treatment device.

At first glance, this inversion appears incongruous since it consists in moving the bulkier article while keeping the more compact article stationary, however that does not take account of the improvement in the conditions of the local treatment, which conditions are much more uniform over the entire part being treated when using the method of the invention.

A posteriori, the inventors explain this improvement, in particular in the context of painting parts, by the fact that in the prior art the nozzle is constantly in motion, thereby preventing the jet of paint from achieving steady conditions suitable for enhancing uniform application. Furthermore, in the prior art, the spraying direction is constantly varying, even though the jet of paint is in a downwardly-directed vertical stream of air (as is needed to restrict the spread of paint away from the working zone) and in the vertical gravity field that is likewise downwardly-directed. Thus, the mechanical conditions under which spraying is taking place vary constantly.

The result obtained by the invention, when the local treatment consists in spraying droplets or solid particles, is better uniformity in the shapes, positions, and densities of the droplets or solid particles at the moment they impact against the surface for treatment, thereby providing a layer of constant thickness with maximum smoothness and brightness.

The method is particularly effective during rapid and jerky movements as imposed by industrial constraints.

In addition, since the conditions under which paint is applied are improved, the paint transfer coefficient is also improved, thereby leading to a smaller quantity of paint being lost, i.e. to a saving of material.

In a particular implementation of the invention, the droplets or solid particles of paint are sprayed vertically, in the downward direction, i.e. in the same direction as gravity and the flow of air.

A first advantage of this implementation is that the droplets or solid particles conserve their density, their shapes, and their dimensions that are optimized for obtaining good quality paint.

A second advantage is that keeping the paint spray nozzle stationary makes it possible to use a device that need not necessarily be light in weight, or flexible, or compact, thereby widening the range of devices that can be used for this purpose and consequently making it possible to use equipment that is selected solely on the criteria of the quality with which it applies paint. Similarly, there is no longer any need for the paint feed network to be capable of following the movements of the spray device, since the device is stationary.

By means of the invention, the industrial installation required for treating parts occupies a smaller amount of space than on a conventional treatment line. The parts for cleaning, painting, inspecting, or coating in adhesive, while being manipulated by the robot are no longer moved by conveyor past successive workstations, but instead remain in a treatment booth in order to be subjected to treatments such as cleaning, scarfing, applying a primary, applying color bases, applying varnish, performing quality control, or depositing adhesive. Furthermore, the pause periods between two treatments, e.g. for drying, dissolving, or flash-off, are implemented by placing the part on a support, whereas in the prior art, such a pause time leads to the conveyor being lengthened.

In a particular implementation, each part is gripped via its portions that are the most deformable. In particular when treating bumper skins with overriders (where the overriders are side parts of the skin extending substantially perpendicularly to the front face of the skin), the bumper skin is gripped by its overriders and the skin is "stretched" like bending a bow in order to stabilize its geometrical shape.

To this end, the invention also provides a gripper for gripping parts of large dimensions, which gripper may advantageously be used for implementing the above-described treatment method but is not limited to that application, given that it is adapted to any utilization in which there is a part of large dimensions presenting a certain amount of flexibility that makes its shape geometrically unstable in the event of being moved, and that needs its shape to be geometrically stabilized for a given operation.

Such a gripper comprises:
a structure; and
holder means carried by the structure, mounted movably thereon, and arranged in such a manner as to be capable:
    in a first position, of gripping the part at rest via its portions that are the most deformable; and
    in a second position, holding the part in a deformed configuration in which its deformable portions cause the part as a whole to take up a shape that is stable.

The use of such a gripper for applying paint is in itself a surprising choice, since it might reasonably have been expected that the layer of paint, on being applied to a deformed part, would present surface defects, in particular surface wrinkles, after the part has returned to its normal shape. That does not happen.

In a preferred embodiment of the invention, the gripper has two to six holding means, and preferably it has four: two on one side of the part and two symmetrically on the other side of the part.

With a bumper skin, one or two holder means grip an overrider and one or two other holder means grip the other overrider.

In another embodiment, compatible with the above embodiment, the structure includes abutments against which the part is pressed in the second position of the holder means. These abutments may be used for imposing a more accurately determined deformed position.

The invention also provides an installation for applying surface treatment to parts, wherein the installation comprises:
a local treatment device that is mounted stationary;
a robot having a manipulator arm arranged to move a part for treatment relative to the local treatment device so as to pass all of its surface for treatment in front of the local treatment device; and
a gripper as defined above mounted at the end of the arm to grip the part.

The invention also provides a booth for surface treatment of parts, wherein the booth comprises at least an enclosure and a surface treatment installation as defined above, and wherein the enclosure is provided with means for connection to external fluid and/or energy circuits.

In a particular embodiment, the enclosure contains an inlet grid for a downward gas stream, the grid being located above the local treatment device.

In a particular embodiment, the enclosure contains a recuperator beneath the local treatment device for recuperating material to be eliminated. Elimination may naturally consist in recycling. In particular, droplets or solid particles of paint may thus be recovered, after being guided towards the recuperator by a downward stream of air coming from the grid.

In a particular embodiment, the booth is constituted by an assembly of transport containers, each constituting an enclosure.

More precisely, in a preferred embodiment, the booth is constituted by an assembly of three transport containers, namely:
a first container containing the robot;
a second container containing the local treatment device and optionally the inlet grid for a gas stream and optionally a recuperator, the second container being designed to be juxtaposed with the first container so that the arm of the robot penetrates into the second container; and
a third container containing a gas stream system, the third container being designed to be superposed on the second container to exchange gas with the second container.

In one embodiment, the invention comprises a method of painting parts of large dimensions that present a certain amount of flexibility causing them to be unstable in shape when moved, the parts being painted by spraying droplets or solid particles using at least one paint spray device, in which method a part having a surface for painting is moved in front of the at least one spray device with its surface for painting facing towards the at least one spray device, the method comprising the following steps: gripping the part at an end of an arm of a robot; keeping the at least one spray device stationary relative to the robot; deforming the part by imparting a deformed configuration thereto in which its deformable portions cause the part as a whole to take up a stable shape; and moving the part relative to the at least one spray device so as to pass all of its surface for painting in front of the at least one spray device while the part is being held in the deformed configuration and while the at least one spray device remains stationary relative to the robot.

In another embodiment, the invention comprises a gripper for gripping parts of large dimensions and adapted to any utilization in which there is a part of large dimensions presenting a certain amount of flexibility that makes its shape geometrically unstable in the event of being moved, and that needs its shape to be geometrically stabilized for a given operation, wherein the gripper comprises a structure; and holder means carried by the structure, mounted movably thereon, and arranged in such a manner as to be capable in a first position, of gripping the part at rest via its portions that are the most deformable; and in a second position, holding the part in a deformed configuration in which its deformable portions cause the part as a whole to take up a shape that is stable.

In yet another embodiment, the invention comprises a gripper for gripping parts of large dimensions and adapted to any utilization in which there is a part of large dimensions presenting a certain amount of flexibility that makes its shape geometrically unstable in the event of being moved, and that needs its shape to be geometrically stabilized for a given operation, wherein the gripper comprises a structure; and a holder carried by the structure, mounted movably thereon, and arranged in such a manner as to be capable in a first position, of gripping the part at rest via its portions that are the most deformable; and in a second position, holding the part in a deformed configuration in which its deformable portions cause the part as a whole to take up a shape that is stable.

In still another embodiment, the invention comprises a surface treatment system for treating a part, the surface treatment system comprising a gripper for gripping the part and for deforming the part into a deformed configuration for painting; a spray device for spraying the part while it is a the deformed configuration; and a robot coupled to the gripper for moving the part relative to the spray device, the spray device remaining stationary during robotic movement.

These and other objects and advantages of the invention will be apparent from the following description, the accompanying drawings and the appended claims.

BRIEF DESCRIPTION OF THE ACCOMPANYING DRAWINGS

The invention can be better understood on reading the following description given purely by way of example and made with reference to the drawings, in which.

DETAILED DESCRIPTION OF THE PREFERRED EMBODIMENTS

Figure 1:
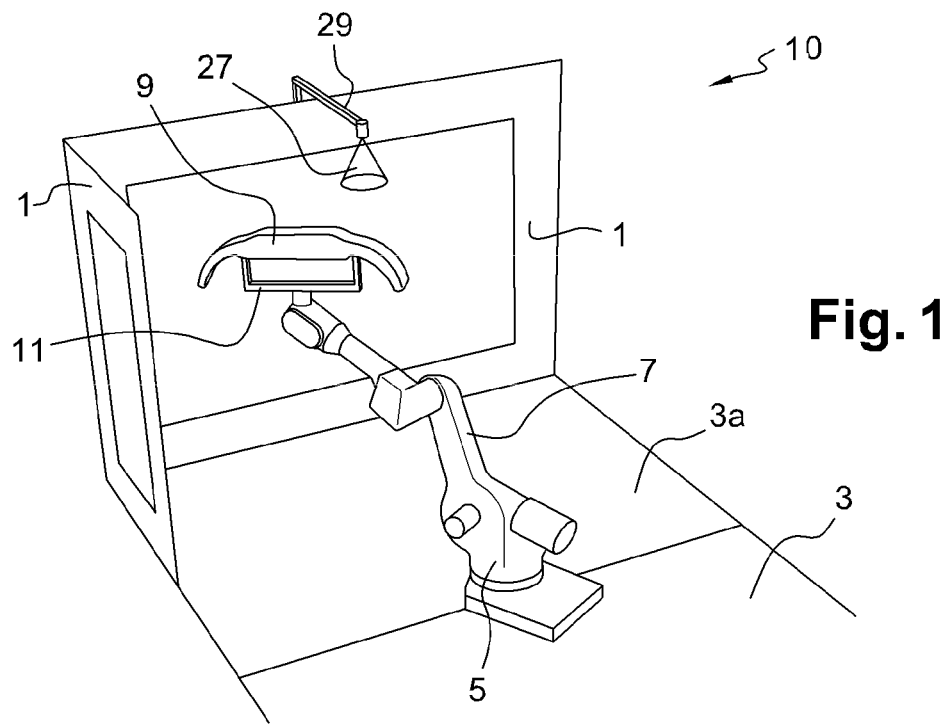
FIG. 1 is a perspective view of a painting booth in a first embodiment of the invention including an installation of the invention.

In FIG. 1, there can be seen a painting booth or installation 10 comprising vertical partitions 1, a ceiling (not shown), and a floor 3, including a gridded portion 3a connected to air suction. A more complete booth 10, made up of three portions, is described with reference to FIGS. 8 and 9. The booth 10 comprises an enclosure containing a painting installation 10.

The floor 3 carries a manipulator robot 5 having a movable arm 7 with six degrees of freedom. Such a robot 5 is in widespread use in the automobile industry and is not described herein. By way of example, the P250 model from the supplier FANUC Robotics America, Inc. of Rochester Hills, Mich., USA, is suitable for implementing the invention. The robot 5 carries a part of large dimensions, and in this example the part is a bumper skin 9.

The end of the arm 7 carries a "universal" gripper, made up of a structure 11, two pneumatic actuators 13, two suction cups 15 constituting holder means, and four abutments 17.

The gripper is said to be "universal" because it can be used, without specific adjustment, in association with a plurality of different parts in a single production campaign. Thus, bumper skins 9 of two or three different models that have been produced at the same time can all be handled by the robot 5 without it being necessary to adjust its gripper between two parts. The gripper needs to be adjusted only in order to prepare it for handling parts in another production campaign. The angular extent of the structure 11, the stroke of the actuators 13, and the length of the abutments 17 are then adjusted.

The structure 11 is made of steel (but by way of example it could equally well be made of aluminum or of carbon) and it includes a bar 19 having two bent ends 21 carrying the pneumatic actuators 13, which pneumatic actuators 13 are hinged so as to be capable of pivoting about branches 23 extending at right angles to the bar 19. A handle 20 in the middle of the bar 19 enables the gripper to be fastened to the end of the robot arm 7.

On each of these branches 23, two stationary abutments 17 are formed by rods welded to the branch 23 and oriented in such a manner that their free ends come into contact with the inside face 25 of the bumper skin 9, as can be seen more clearly with reference to FIGS. 2 to 5.

As can be seen in FIG. 1, the movable arm 7 is capable, with the help of the universal gripper, of presenting the bumper skin 9 in front of a spray device 27 situated at a distance from the ceiling of the booth 10 and fed with paint by a rigid pipe 29. The spray device 27 is stationary and positioned in such a manner that a part can be oriented and placed with its portion for treatment facing the spray device 27.

The stream of paint droplets sprayed by the spray device 27 is delivered in a vertical downward direction by the spray device 27 onto the bumper skin 9. The stream is thus oriented in the same direction as the stream of air penetrating into the grid 3a and in the gravity direction. It therefore benefits from optimum conditions for being applied in uniform manner over the entire surface for painting of the bumper skin 9.

The surface for painting is the outside face of the bumper skin 9. It is covered in a uniform layer of paint because the arm 7 moves the bumper skin 9 so as to present each portion for painting of the surface at the right distance and for the appropriate exposure time.

These movements of the bumper skin 9 lead to jolts that, in accordance with the invention, need to be eliminated in order to avoid defects in the final layer of paint. For this purpose, the overriders 9a of the bumper skin 9 are stabilized by performing the steps shown in FIGS. 2 to 5.

Figure 2:
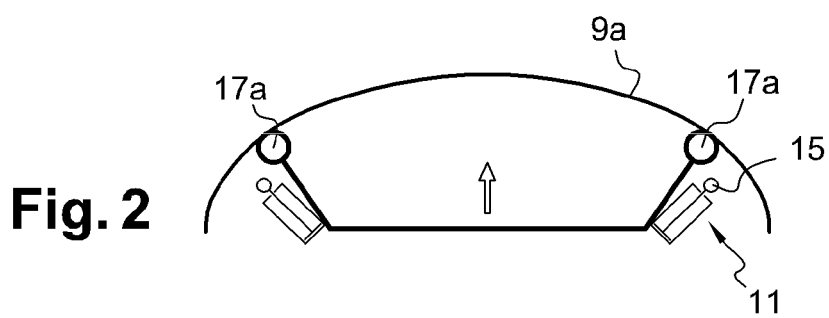
FIG. 2 is a section view of the part at rest, immediately before being gripped by the robot.
Figure 3:
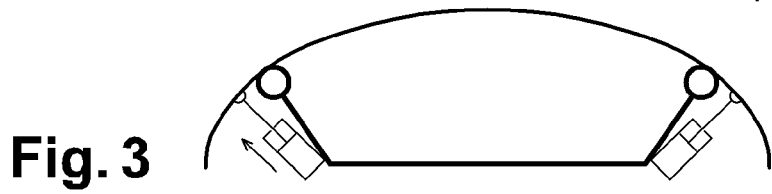
FIGS. 3 to 5 are views analogous to FIG. 2 respectively showing the part at the beginning of being gripped, at the beginning of being deformed, and at the end of being put into a stable shape.

In FIG. 2, the bumper skin 9 is at rest. Its overriders 9a constitute its most deformable portions. The structure is moved towards the inside face of the bumper skin 9 until the free ends 17a of the abutments 17 come into contact with the bumper skin 9.

In the following step (FIG. 3), the pneumatic actuators 13 are actuated so as to press the suction cups 15 against the inside faces of the overriders 9a, and then air is sucked from each suction cup 15 (in well-known manner) so as to cause the part to be held by its overriders 9a.

Figure 4:
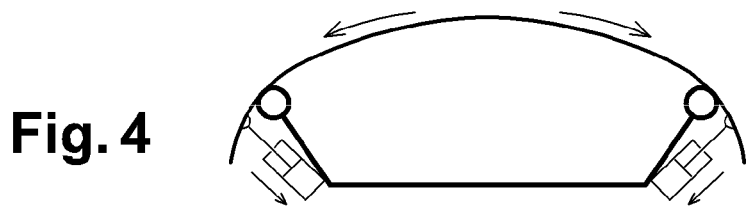

During the step shown in FIG. 4, the pneumatic actuators 13 are operated in the opposite direction so as to "stretch" the bumper skin 9, causing it to take up a deformed configuration, thereby enabling the bumper skin 9 to become somewhat rigid overall.

Figure 5:
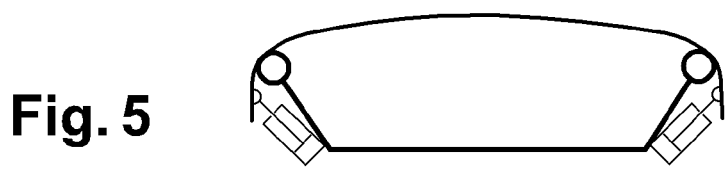
Figure 6:
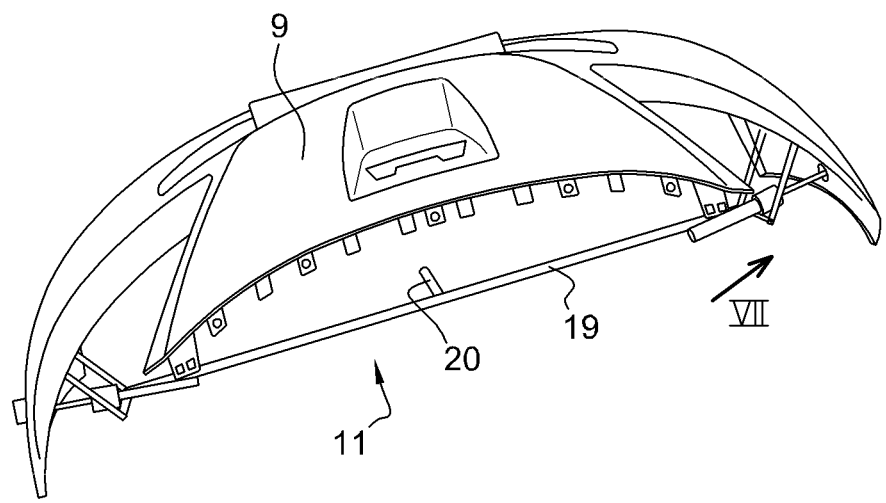
FIG. 6 is a perspective view of the part after it has been deformed as shown in FIG. 5.
Figure 7:
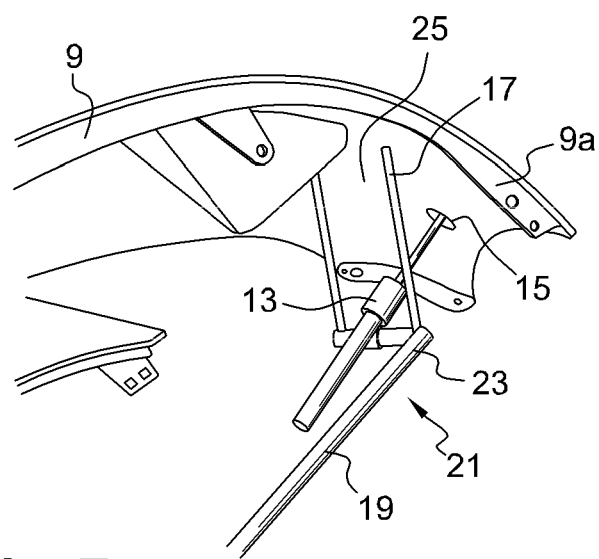
FIG. 7 is a close-up view looking along arrow VII of FIG. 6.

Once the actuators 13 have been retracted, the bumper skin 9 reaches the position shown in FIG. 5 where it has sufficient rigidity to be capable of accommodating jolts without deforming.

In particular, the bumper skin 9 may accommodate rapid movements imparted by the manipulator arm 7 during paint-spraying operations.

The bumper skin 9 can thus be presented by the manipulator arm 7 in front of the spray device 27 so that its outside face receives a uniform layer of paint (except in locations that are not to be painted).

It should be observed that no trace of paint running is to be observed on the part as painted in this way, even though it might have been feared that frequent changes in the orientation of the bumper skin 9 would lead quite easily to such running.

Figure 8:
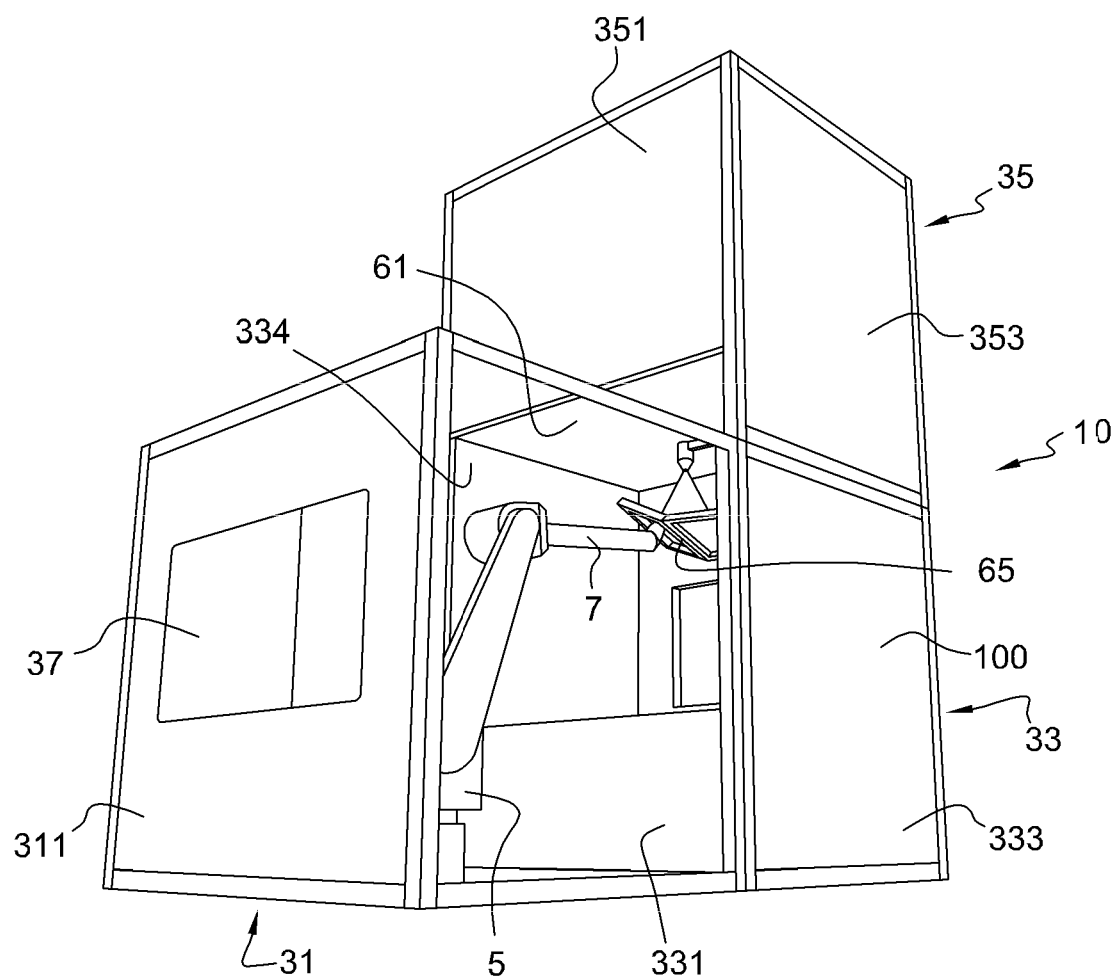
FIG. 8 is a perspective view of a painting booth in another embodiment of the invention.
Figure 9:
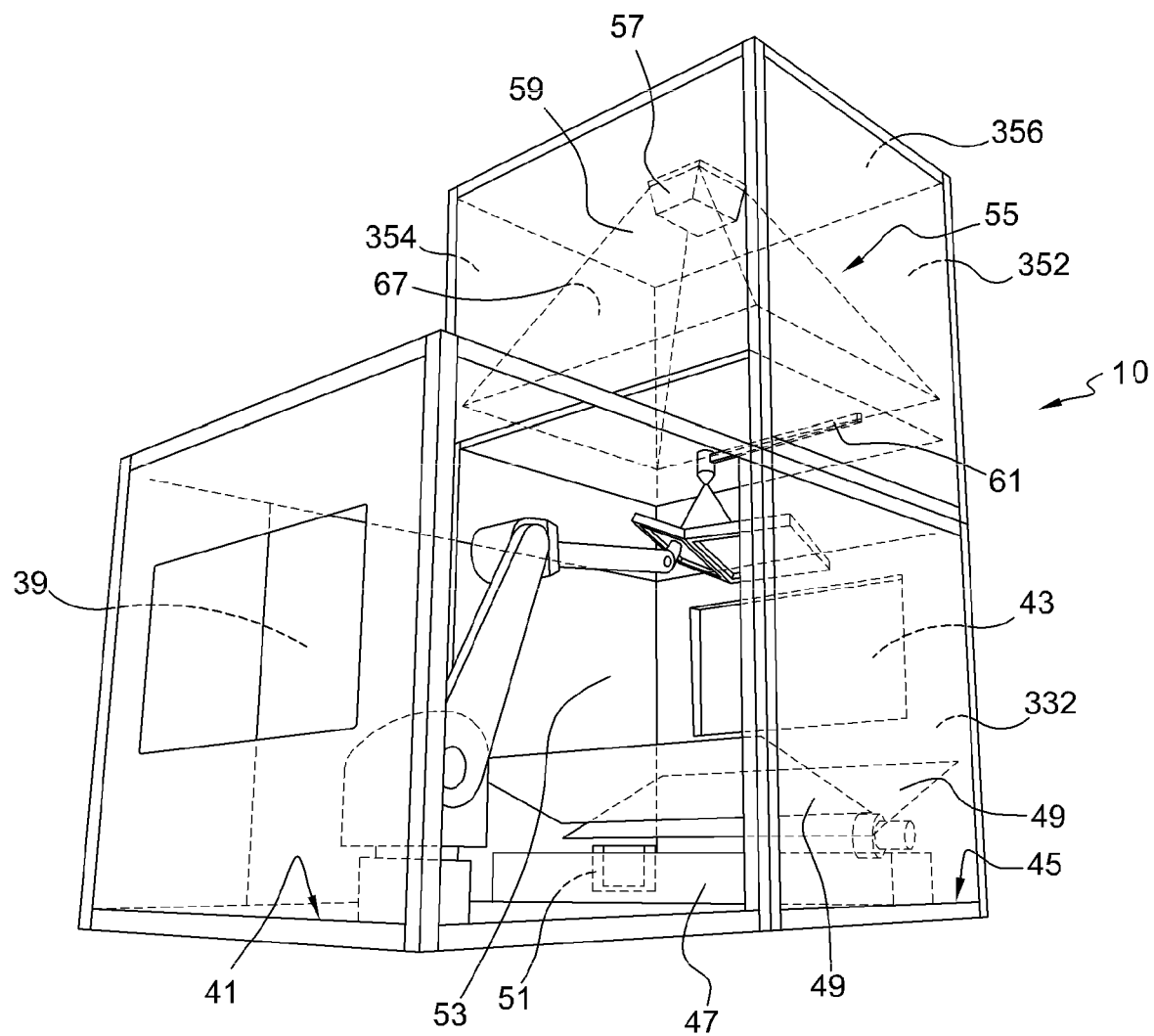
FIG. 9 is a view analogous to FIG. 8 in which the parts are shown by transparency so as to reveal the portions that cannot be seen in FIG. 8.

FIGS. 8 and 9 show a painting booth in another embodiment of the invention for paint application treatment on a part 100. This booth is made up of three enclosures 31, 33, 35 of dimensions that are identical to the dimensions of transport containers. The booth also includes a painting installation 10.

The standard dimensions for containers are 2.44 meters (m) in width and 2.59 m in height, for containers having lengths of 3 m, 6 m, and 12 m. The three enclosures of FIGS. 8 and 9 have a length of 3 m, however other known types can be used, possibly after rearranging elements within the various containers.

The booths may be assembled together by bolting and jointing.

In order to make them, it is possible to start with containers that are modified by removing certain walls or by cutting the walls away, and then by adding the elements that are described below.

The first enclosure 31 contains the robot 5. For this purpose, it has electrical connections (not shown) for powering the robot 5 and for lighting the booth 10.

A window 37 is arranged in the closed wall of one of the large side faces 311, so as to make it possible to verify that the booth 10 is operating properly, while the opposite large side face is completely open. One of the small side faces is half-closed by a partition 39 extending from the open large face halfway to the large face 311 having a window, and the other small side face is completely open.

The enclosure 31 has a floor 41 over its bottom face, but no ceiling over its top face.

The second enclosure 33 is juxtaposed to the first, with one of its large faces 331 being open for its top three-fourths against the open large face of the first enclosure 31. As can be seen in the drawing, this opening allows the manipulator arm 7 of the robot 5 to penetrate into the second enclosure 33 in order to move the part for painting 100 therein.

The other large side face 332 of the second enclosure 33 is closed by a wall having a window 43 identical to the window 37 of the first enclosure 31. The two small side faces 333 and 334 of the enclosure are closed by solid walls.

The floor 45 closing the bottom face of the second enclosure 33 carries a retention pan 47 surmounted by two water-flow sloping planes 49 serving in well-known manner to recuperate the droplets or solid particles of paint that have not reached the surface for painting of a part.

An air suction inlet 51 is situated level with the floor 45 and communicates with a chimney 53 running along the small face 334 of the second enclosure 33 to the open top face of the second enclosure 33.

This second enclosure 33 is fitted with connections (not shown) for connection to a water network (supply and filtering) and to an electricity network for lighting.

The third enclosure 35 is placed on the second enclosure 33. It has two large side faces 351 and 352, one of which is closed over its top four-fifths and the other of which is completely closed, and two small side faces 353 and 354 that are completely closed. The bottom face of the third enclosure 35 is open, while its top face has a ceiling 356.

The third enclosure 35 contains a hood 55 via which a stream of air arrives, this hood 55 being constituted by:
a coupling 57 to a forced draft network (or a fan outlet) passing through the ceiling of the third enclosure 35;
a prismatic chamber 59 extending from the coupling 57 to the side walls 351, 352, 353, and 354, at the bottom of the wall of the large side face 351; and
an air grid 61 parallel to the bottom face 355 and closing the prismatic chamber 59.

The air grid 61 situated on top of the second enclosure 33 constitutes the ceiling of the paint spray zone.

Under this air grid 61, the third enclosure 35 contains the paint spray device, constituted in this enclosure by a pipe 63 and an applicator 65. Pipes (not shown) enable the spray device to be fed with paint.

The third enclosure 35 also contains a chimney 67 that extends the chimney 53 of the second enclosure 33 to the ceiling 356 of the third enclosure 35. A coupling 69 to a network for sucking in for filtering passes through the wall of the top face 356.

When assembled together in this way, the three enclosures 31, 33, and 35 constitute a complete painting booth, capable of processing parts for painting that are of different shapes both effectively and with a high level of quality.

Optionally, a fourth enclosure (not shown) may be added to the assembly in order to define a resting zone (drying, flash-off, etc.) or indeed a fifth enclosure (not shown) for defining a stoving zone.

It can be understood that the booth as set up in this way can easily be dismantled and transported for re-use in different factories, and/or is capable of being reconfigured by "modular" reorganization, so as to be adapted to processing new products.

Naturally, the embodiments described above are not limiting in any way and may receive any desirable modification without going beyond the ambit defined by the accompanying claims.

While the method and system herein described constitute preferred embodiments of this invention, it is to be understood that the invention is not limited to this precise method and system, and that changes may be made therein without departing from the scope of the invention which is defined in the appended claims.

What is claimed is:

1. A method of painting parts that present a certain amount of flexibility causing them to be unstable in shape when moved, the parts being painted by spraying droplets or solid particles using at least one paint spray device, in which method a part having a surface for painting is moved in front of the at least one spray device with its surface for painting facing towards the at least one spray device, the method comprising the following steps:
gripping said part at an end of an arm of a robot,
keeping said at least one spray device stationary relative to said robot;
deforming said part by imparting a deformed configuration thereto in which its deformable portions cause said part as a whole to take up a stable shape; and
moving said part relative to said at least one spray device so as to pass all of its surface for painting in front of said at least one spray device while said part is being held in the deformed configuration and while said at least one spray device remains stationary relative to said robot;
wherein said part is a bumper skin having at least one overrider, said at least one overrider being side portions of said bumper skin extending substantially perpendicularly to a front face of said bumper skin, and said bumper skin being gripped via said at least one overrider and said bumper skin being "stretched" in order to stabilize its shape.

2. The method according to claim 1, wherein the paint is sprayed downwards in a vertical direction.

3. The method according to claim 1, wherein each part is gripped via its most deformable portions.

4. The method according to claim 1, wherein said method further comprises the step of:
using a gripper for gripping parts of large dimensions and adapted to any utilization in which there is a part of large dimensions presenting a certain amount of flexibility that makes its shape geometrically unstable in the event of being moved, and that needs its shape to be geometrically stabilized for a given operation, wherein said gripper comprises:
a structure; and
holder means carried by said structure, mounted movably thereon, and arranged in such a manner as to be capable:
in a first position, of gripping said part at rest via its portions that are the most deformable; and
in a second position, holding said part in a deformed configuration in which its deformable portions cause said part as a whole to take up a shape that is stable.

5. The method according to claim 4, wherein said gripper has three to six holding means, and preferably four: two on one side of said part and two symmetrically on the other side of said part.

6. The method according to claim 4, wherein said structure includes abutments against which said part is pressed in said second position of said holder means.

7. The method according to claim 4 wherein said gripper is used for applying paint on parts of large dimensions.

8. The method according to claim 4, wherein said method further comprises the step of:
using an installation for applying surface treatment to parts, wherein the installation comprises:
a local treatment device that is mounted stationary;
a robot having a manipulator arm arranged to move a part for treatment relative to said local treatment device so as to pass all of its surface for treatment in front of said local treatment device; and
a gripper mounted at an end of said manipulator arm to grip said part.

9. The method according to claim 8, wherein said method further comprises the step of:
using a booth for surface treatment of parts, wherein said booth comprises at least one enclosure and said surface treatment installation, and wherein said at least one enclosure is provided with means for connection to external fluid and/or energy circuits.

10. The method according to claim 9, wherein said booth includes an inlet grid for a downward gas stream, said inlet grid being located above said local treatment device.

11. The method according to claim 9, wherein said booth contains a recuperator beneath said local treatment device for recuperating material to be eliminated.

12. The method according to claim 9, wherein said booth is constituted by an assembly of transport containers, each constituting an enclosure.

13. The method according to claim 12, wherein said booth is constituted by an assembly of three transport containers, namely:
a first container containing said robot;
a second container containing said local treatment device and optionally said inlet grid for a gas stream and optionally a recuperator, said second container being designed to be juxtaposed with said first container so that said manipulator arm of said robot penetrates into said second container; and
a third container containing a gas stream system, said third container being designed to be superposed on said second container to exchange gas with said second container.

14. The method according to claim 1, wherein said bumper skin comprises a plurality of overriders.

15. A The method according to claim 1, wherein said method further comprises the step of:
using a gripper for gripping automotive parts adapted to be sprayed or painted at a spray or painting station, wherein said gripper comprises:
a structure; and
a holder carried by said structure, mounted movably thereon, and arranged in such a manner as to be capable:
gripping said part while in a first position while at rest, said part being unstable; and
distorting said part into a second position defining a deformed configuration wherein said part becomes stable for spraying or painting and in which its deformable portions cause said part as a whole to take up a shape that is stable.

16. The method according to claim 15, wherein said gripper comprises at least three but less than six holders.

17. The method according to claim 15, wherein said structure includes abutments against which said part is pressed in said second position of said holder.

18. The method according to claim 15, wherein said gripper is used for applying paint on automotive parts.

19. The method according to claim 1, wherein said method further comprises the step of:
using a surface treatment system for treating a part, said surface treatment system comprising:
a gripper for gripping said part and for deforming said part from an unstable first position into a second position defining a stable deformed configuration for painting;
a spray device for spraying said part while it is in said deformed configuration; and
a robot coupled to said gripper for moving said part relative to said spray device, said spray device remaining stationary during robotic movement.

20. The method according to claim 19, wherein said spray device is situated above said gripper and sprays downward.

21. The method according to claim 19, wherein said part is a bumper skin and said spray device sprays paint downward during movement of said bumper skin by said gripper and said robot.

22. The method according to claim 19, wherein said gripper deforms said part into an arcuate, curved or bowl configuration.

* * * * *

UNITED STATES PATENT AND TRADEMARK OFFICE
CERTIFICATE OF CORRECTION

PATENT NO. : 9,005,715 B2  
APPLICATION NO. : 13/519164  
DATED : April 14, 2015  
INVENTOR(S) : Tresse Page 1 of 1

It is certified that error appears in the above-identified patent and that said Letters Patent is hereby corrected as shown below:

In the Claims

Claim 15, Col. 10, line 17, delete "A" before "The".

Signed and Sealed this
Eighth Day of September, 2015

Michelle K. Lee
*Director of the United States Patent and Trademark Office*